Jan. 28, 1947.                M. N. YARDENY ET AL                    2,414,916
                        STROBOSCOPIC LOAD POSITION INDICATOR
                     Filed Dec. 8, 1944            3 Sheets-Sheet 1

MICHEL N. YARDENY
ROBERT BERNAS
INVENTORS

BY
ATTORNEY

Patented Jan. 28, 1947

2,414,916

UNITED STATES PATENT OFFICE 2,414,916

STROBOSCOPIC LOAD POSITION INDICATOR

Michel N. Yardeny and Robert Bernas, New York,
N. Y.; said Bernas assignor to said Yardeny Application December 8, 1944, Serial No. 567,238

4 Claims. (Cl. 177—311)

This invention relates to apparatus for controllably moving and positioning a load more or less distant from a control point.

More particularly, the present invention relates to means for always indicating the exact position of a load operated by a load motor or other load-moving means, and for giving this indication, in a simple and improved manner, at a tell-tale location observable from the point of load-movement control.

According to the present invention, the indicating device is a signal periodically rendered visible.

When the movement of a load is to be controlled from a remote point, and in other cases, especially where a control motor is used and a load motor is employed which has speed characteristics differing from those of the control motor, it is important to be able to determine, from an indicating device at the control point, precisely the position of the load at any instant. In this connection a novel indicating means and method is provided by the present invention.

In a now preferred way of practicing the invention, the accuracy of the indication is supervised and insured by means involving the use of two self-starting synchronous motors.

Accordingly, another feature of the invention is a simple and readily operable means for synchronizing, in preparation for a use of the apparatus, the instant when a particular angular position is reached by an element operating with a first revoluble member driven by one of the two synchronous motors, and the instant when the same or a corresponding angular position is reached by an element operating with a second revoluble member driven by the other synchronous motor. These revoluble members are for causing their said elements to travel continuously and simultaneously each through its own circular or other cyclic path, and so that one of said elements thus travels at the same angular speed as, or at an angular speed proportional to the angular speed of the other element. The angular position of said element operating with said first revoluble member (this element hereinafter called the governing element) is a variable one; varying in agreement with varying locations of the load, either when at rest or while being moved along its prevised rotary, rectilinear or other path of movement. The element operating with said second revoluble member (this element, the signal, and sometimes hereinafter called the governed element) always has an angular position corresponding to that of the governing element at the instant of signalling. Thus, according to the invention, the location in space of the signal when made visible, affords a precisely accurate index of the true position of the load; whether this true position be an angular one, as where the load is rotated, or otherwise.

The above referred to synchronizing means of the invention is one such that synchronization of the governed and governing elements may be readily effected, following coincidental starting of both synchronous motors and initiation of rotation of the revoluble member with which the governing element operates.

This synchronizing means of the invention is also one operable for correcting any departure from synchronism between the two synchronous motors giving rise to non-synchronous angular positions of the governed and governing elements, while the apparatus is in use; such departure the result, for instance, of a momentary interruption of current supply.

Another feature of the invention is a combination of parts such that the method and apparatus of the invention meet the desideration that prevention of blurring or flickering of the indicium is simply and easily accomplished.

Another aim of the invention is to provide a novel and a valuable combination of load-moving means; stroboscopic indicating means for registering the position of the load at any instant and functionable at any distance from the load-moving means; means operable at a distance from the load moving means for controlling operation of the load-moving means; and means operable at a distance from what may be called the stroboscopic indicator for effecting zero-point correction of the same.

The foregoing and various other features and advantages of the invention will be clearly understood from the following description of now favored embodiments of the invention, as illustratively shown in the accompanying drawings, in which.

Figure 1:
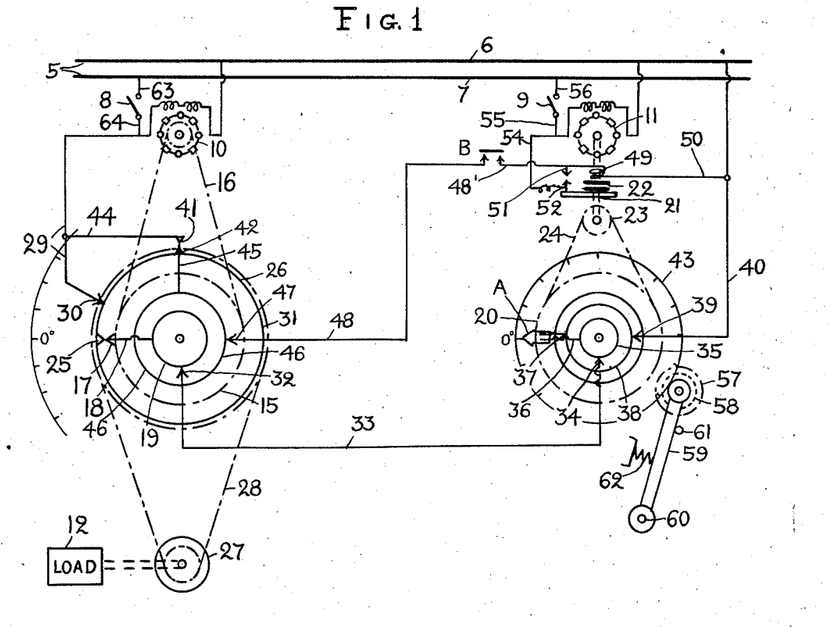
Fig. 1 is a diagrammatic view, partially structural, showing one of said embodiments.

The control apparatus shown in Fig. 1 includes an A.-C. current source 5; to the terminals 6 and 7 of which may be connected, by closing two manual switches 8 and 9, two self-starting synchronous motors 10 and 11.

A load to be moved, say rotatively, is indicated at 12.

Synchronous motor 10 drives a revoluble disc 15, by means here shown as including a belt or chain transmission 16, for establishing any desired speed ratio as between the motor shaft and the disc. The disc 15 carries a contact point 17, connected by a lead 18 to a slip-ring 19 on the disc.

This contact point 17 is the aforesaid governing element operating with the aforesaid first revoluble member, the disc 15.

The contact point 17 is for closing a circuit to render momentarily effective a stroboscopic device which, as herein shown, includes a disc 20, and a source of stroboscopic flash, the light-supply means for which is an electric lamp A. This lamp, which, for quick and full flash, is desirably a gaseous glow tube, is shown as carried on the inspection side of disc 20, which latter is positioned at a tell-tale or indicator location observable from the load-movement control-point. Disc 20 is operatively connected to the other synchronous motor, 11, by means for establishing, as between the motor 11 and the disc 20, the same speed ratio as between the motor 10 and the disc 15, or a multiple thereof. This operative connection as shown includes a shaft 21 suitably coupled to the shaft of motor 11; an electromagnetic clutch 22 interposed in the shaft 21, a pinion 23 or the like fixed on the shaft 21 beyond the clutch, and a suitable belt or chain transmission 24 between the pinion and the disc 20.

The lamp A is shown as shaped like an arrow or pointer, directed radially outward from the center of revolution of the disc 20; and its flash is the aforesaid governed element, moving with the aforesaid second revoluble member, the disc 20. Said flash is the stroboscopic indicium.

Momentary closing of the circuit including the lamp A, to cause the lamp to flash, may be effected one or more times during each, or once, after several revolutions of the disc 20.

In order to have the lamp A thus flash for stroboscopic purposes, say once during each revolution of the disc 20, there is provided a contact point 25 cooperant with the contact point 17 on the disc 15, for closing the lamp circuit. Contact point 25 is on another revoluble disc 26 mounted concentric with but free to rotate relative to the disc 15. To cause the angular position of the contact point 25 to vary according to any variation in the angular position of the load, an operative connection is provided between the load 12 and the disc 26, which connection, as shown, includes a pinion 27 or the like and a belt or chain transmission 28.

For each fleeting instant of touching of the contact points 17 and 25, a circuit is closed for the lamp A. This circuit, from the terminal 7 and beyond the switch 8 includes a lead 29, a brush 30, a peripheral slip-ring 31 on the disc 26, the contact points 25 and 17, lead 18, the slip-ring 19 on the disc 15, a brush 32 for the latter, a lead 33 to a brush 34 engaging a slip-ring 35 on the disc 20 of the stroboscopic device, a lead 36 from said slip-ring to one terminal of the lamp A, a lead 37 from the other terminal of the lamp to another slip-ring 38 on said disc, a brush 39 engaging this slip-ring, and a lead 40 back to the current source terminal 6.

In order, during use of the apparatus, to have a flash of the lamp A constitute a stroboscopic indicium which is representative of the true position of the load at any instant, it is necessary not only that the disc 20 revolve with and at the same speed as the disc 15 but also that the disc 20 starts revolving at full speed at an instant when the contact point 17 on disc 15 and the pointed end of the lamp A on disc 20 are in angular positions definitely relative to each other.

The means for attaining this synchronization includes a fixed contact point 41 so placed as to be engaged, at a predetermined instant during rotation of the disc 15, by a contact point 42 carried by said disc. This contact point 42 has a fixed relation with the contact point 17 also on the disc 15, say a 90° displacement therefrom, as shown, so that when the contact point 42 reaches the contact 41, the disc 15 is in what may be called its zero or starting position. That is, when the contact points 41 and 42 touch, the contact point 17 on disc 15 is in the same angular position as the pointed end of the lamp A. This position is indicated as the zero position on a fixed scale as shown at 43 in subtending relation to the disc 20.

Assuming such synchronization, when the load 12 is moved in either direction, the corresponding movement of the disc 26 changes the angular position of contact 25 to cause flash of the lamp A by engagement of contacts 25, 17 when the lamp A is in the same angular position as the contact 25 and hence in a position corresponding to the angular position of the load 12. Thus, during movement of the load, the location of the lamp flash will vary, to show the true position of the load as read from the calibrations of the scale 43.

These contact points 41 and 42 which operate with the disc 15 are in a circuit including a lead 44 (from the terminal 7 of current source 5, via the lead 29) to the contact point 41; a lead 45 from the contact point 42 to a slip-ring 46 on the disc 15; a brush 47 engaging said slip-ring; leads 48 and 48' from the brush 47 to and through the coil of a solenoid 49 for effectuating the electromagnetic clutch 22 when a normally open manual switch B between the lead 48 and 48' is closed; and a lead 50 and the lead 40 to the terminal 6 of the current source. A self-locking shunt circuit for the solenoid 49 is closed by a pair of contact points 51, 52 being brought together incidental to energization of the solenoid 49 for throwing in the clutch 22. The contact point 51 is connected to the lead 48' between the switch B and the solenoid 49, and the contact point 52 is connected by leads 54, 55, switch 9, and a lead 56, to the terminal 7 of the current source.

The synchronizing means now being described also includes an instrumentality, operable manually or otherwise, for use before rotation of the disc 20 is started, to adjust the latter so that the angular position of the lamp A will be the same as that of the contact point 17 on the disc 15, when contact 42 next engages fixed contact 41, by initiating rotation of disc 20 after closing of the switch B.

This adjusting instrumentality is here shown as including a friction wheel 57, mounted movably for temporary placement in peripheral engagement with the disc 20; so that then said disc can be rotated to rotate the disc 20 when a knob 58 fixed to the wheel 57 is manually turned. This knob and wheel are shown as mounted for rotation on the free end of an arm 59 pivoted at 60 and normally yieldingly held against a stop 61 by a spring 62 to maintain the wheel 57 spaced from the disc 20.

In synchronizing the apparatus to prepare it for use, the following is the procedure:

Both synchronous motors 10 and 11 are started up, by closing of the switches 8 and 9. The disc 15 now rotates with the motor 10, and assuming the load is not now being moved to cause corresponding movement of the disc 26, and noting that the switch B has not yet been closed, this disc 15 is the only one of the three discs 15, 26 and 20 now moving.

Then, the knob 58 having been grasped, the arm 59 is swung against opposition of the spring 62 to place the wheel 57 in friction-drive relation to the disc 20; and the knob is turned until the pointed end of the lamp A is in line with the "0" point of scale 43. This having been done, the knob is released and the arm 59 is allowed to swing back against the stop 61.

Last, the switch B is closed.

The apparatus is now set for automatic start of rotation of the disc 20, and in such manner as to insure that during subsequent rotation of the said disc simultaneously with disc 15 the contact point 17 on this disc and the lamp A on the disc 20 will at any instant be in the same angular position.

Such start of rotation of the disc 20 occurs at the very next engagement of the contact point 42 on the disc 15 with the fixed contact point 41; as then an energizing circuit for the solenoid 49 is momentarily closed.

This circuit, traced from the terminal 7 of the source of current, comprises a lead 63, the switch 8, leads 64, 29, 44, the contacts 41 and 42, the lead 45, the slip-ring 46 on disc 15, the brush 47, the lead 48, the switch B, the solenoid 49, and the leads 50, 40 back to the terminal 6 of the source of current. Energization of the solenoid 49 throws in the clutch 22, thus coupling the disc 20 to the motor 11 for immediate start of rotation therewith at the speed of said motor, and, consequently, the motors 10 and 11 being synchronous motors, at a speed of rotation predeterminedly related to the speed of rotation of the disc 15. The clutch 22 remains in, because as above the circuit for the solenoid 49 is a self-locking one, due to the shunt including the contacts 51 and 52, which contacts engage during the fleeting energization of the solenoid. Thus the clutch will remain thrown in until opening of the switch 9.

Hence the switch B which may be of ordinary push-button type, need be closed only momentarily, to effect synchronization coincidental with engagement of contacts 42, 41, thus initiating rotation of disc 20.

The synchronizing means described can also be used for correcting any departure from synchronism as between any angular position of the contact 17 and the angular position of the pointed end of the lamp A, during use of the apparatus. The first operation required is to open the switch 9, thereby breaking the shunt circuit for energizing the solenoid 49 by way of the contacts 51 and 52, and so unclutching the disc 20 from the synchronous motor 11. As opening of switch 9 also deenergizes said motor, the switch 9 is now closed again, to restart the motor 11. Thereafter the only operations to be performed are the two simple steps as already explained; that is, first to use the knob 58 to set the point of the lamp A in line with the "0" of the scale 43, and then momentarily close the switch B.

By way of example, the scale 43 is shown as extending merely over a part of a circle. As will be understood, the same may cover a full circle, or 360°.

The disc 20 is desirably of opaque material.

The lamp A instead of being itself shaped to have a pointed end directed toward the scale 43, which might be very desirable, can be otherwise shaped, and, in each case, otherwise mounted on the disc than at the front thereof, or even mounted on a support fixed relative to the disc.

Figure 2:
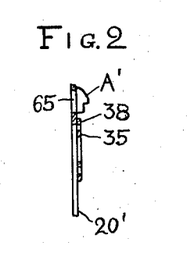
Fig. 2 is a detail view, illustrating a modified form of the light supply means for the source of stroboscopic flash.

Referring to Fig. 2, the disc, here marked 20', could, for instance, have a suitably shaped slot 65 cut therethrough, or an equivalent in the shape of a transpicuous window in lieu of the slot; and a neon or other glow lamp A', of any ordinary commercial shape and size, could be carried at such slot or window location but at the rear side of the disc; with the same circuits employed as above described, in which connection note the showing in Fig. 2 of the slip-rings 35 and 38 of Fig. 1.

Also, with the disc equipped with a slot or window as just mentioned, the lamp (not shown) could be fixed in position behind the disc, and be of the same or almost the same diameter as said disc, and directed head-on toward the rear of the disc.

Figure 3:
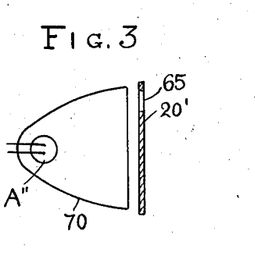
Fig. 3 is a similar view, showing another modification in the light supply means for said source.

Again, as illustrated in Fig. 3, the same idea could be carried out should the disc 20' be made rather large, as for more accurate reading of the scale 43, by using a lamp, say a standard size glow lamp A'' much smaller in diameter than the disc, but placed in a well-known type of parabolic reflector 70, designed to throw the lamp flash against all or a sufficiently large area of the rear face of the disc 20' to include the bounds of the slot or window 65.

Figure 4:
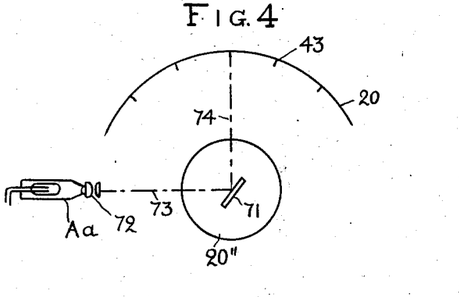
Fig. 4 is a schematic view showing still another modification of the source of stroboscopic flash.

Also, as shown in Fig. 4, the light-supply means for the source of light-flash to furnish the indicium can be some distance removed from and beyond the bounds of the disc. That is, such a disc or that illustrated at 20'', shown as relatively small in diameter can carry on its observation side a small mirror 71, at such a tilt relative to a lamp Aa, behind a condensing lens 72, that a light pencil 73 from the lamp will strike the mirror to cause emission therefrom of a reflected light pencil 74 so directed as always to properly cooperate with the calibrated scale 43, that is, for example, to register with a calibration of the scale to indicate the position of the load.

When the rotation of disc 20 is of sufficient speed, the indicium will appear to be fixed in space when the load is not moving, and will appear to move, and to move correspondingly with the load, as the load moves. For instance, in an arrangement as shown in Fig. 1, the indicium, when the load is at a standstill, will appear to the eye as an illuminated arrow in a fixed location and one exactly corresponding with the true position of the load, that is, at a location exactly corresponding to the location of the contact point 25 on the disc 26. In either of these situations the indicium is being periodically flashed, as explained above, such flash occurring each time the contact point 17 on the disc 20 passes the contact point 25 on the disc 26.

It has been stated above that a feature of the invention is the provision of a combination of parts such that the method and apparatus of the invention may be carried out in a way to allow simple and easy prevention of blurring or flickering of the indicium, provided if, for some special reason, it is desired to flash the indicium very rapidly. As will now be understood, to prevent blurring of the indicium, it is merely required (since the motors 10 and 11 are synchronous motors, and the invention as above explained provides means for readily correcting any departure from synchronism between them) to have the transmissions 16 and 24 of proper speed reduction values relative to the rotational speeds of discs 15 and 20. If these discs rotate at speeds so high that the motion of contact point 17 relative to contact point 25 is too fast as compared with the inertia of the extinguishing speed of the lamp, the indicium will appear spread over a greater distance than its dimension in its direction of travel and will consequently appear blurred. On the other hand, when the speed of rotation of the discs 15 and 20 is too slow for the inertia of the eye's retina to see the indicium as a continuous image, flickering will occur. With proper speeds of the discs 15 and 20, however, the indicium, clear in outline and steady, will appear fixed in space at an angular position in exact agreement with the angular position of the load when the load is at a standstill; and when contact point 25 with disc 26 is moved to change its angular position in agreement with a change of angular position of the load, the indicium will change its own position accordingly, so that, during movement of the load, the indicium will seem to be a non-intermittent one traveling through a circular path.

Figures 5, 7:
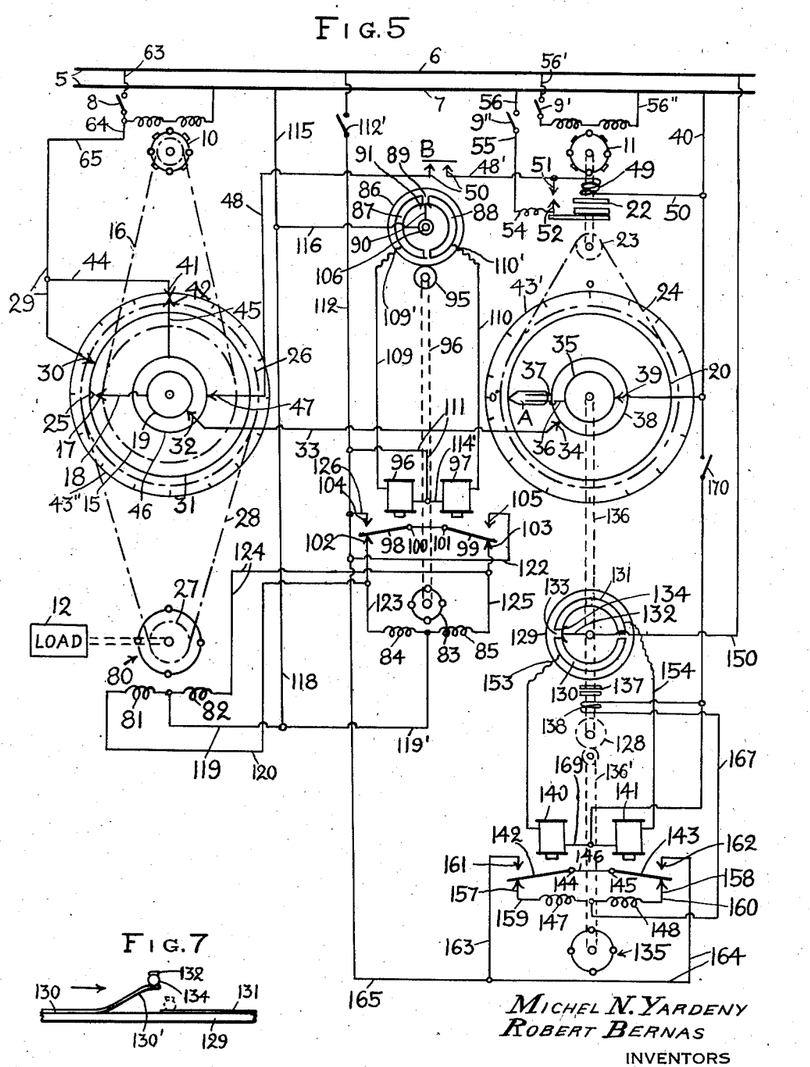
Fig. 5 is a view similar to Fig. 1 but showing a modification incorporating remote control devices, one for controlling the load moving means, and the other for operating the synchronizing means.
Fig. 7 is a detail view of a now preferred arrangement of certain of the parts shown in Fig. 5.

Referring now to Fig. 5, an apparatus similar to that shown in Fig. 1 is illustrated but in combination with a remote control device for effecting a desired movement of the load, and with a remote control device for zero setting of the lamp A for synchronization prior to starting of disc 20.

Except for these remote control means, the apparatus of Fig. 5 includes parts generally corresponding with those of Fig. 1, and marked with similar reference characters. It is pointed out, however, that instead of connecting lead 55 beyond switch 9 with both the synchronous motor 11 and the solenoid 49 for operating the clutch 22, as in Fig. 1, a different arrangement is provided in Fig. 5. Here the switch 9'' controls the self-locking circuit for the solenoid without affecting the motor 11. The latter is arranged to be separately connected to the source of current 5 by leads 56' and 56'', when a switch 9' is closed.

Referring first to the means for remote control of the load movement, the pinion 27, as shown, is fixed on the shaft of a load motor 80 of the squirrel cage single phase induction type, with reversing windings 81 and 82. Means operable from a remote control point is provided for energizing either of the windings 81 and 82, in one case to rotate the motor 80 in one direction and in the other case to rotate said motor in the opposite direction, and for deenergizing both windings simultaneously to stop the motor.

A control motor 83 which may be of any suitable type, is provided as the actuator for one of a pair of independently, relatively movable contact elements included in a switch device, here shown as a rotary one, for controlling operation of load motor 80 at the will of the operator. This control motor may be made of small dimensions for use where space may be at a premium, and to have a small torque compared to that desirable for the load motor. Whatever be the type of motor selected for the control motor, the same is here shown, to simplify the drawings, as of the same type as the motor 80, with reversing windings 84, 85. The load motor 80, may have speed characteristics different from those of the control motor 83.

Said switch device comprises a revolubly mounted disc 86 of insulation material having fixed thereon a pair of arcuate conducting segments 87 and 88 separated by a neutral point or gap 89, and a contact arm 90, pivoted concentrically with the axis of rotation of the disc 86 and carrying a contactor 91 wide enough to place both segments in circuit when the contactor bridges the gap. Said segments constitute one of the above mentioned pair of independently relatively movable control elements, and said contactor is the other such element. The disc carrying the segments rotates with the control motor 83, as by friction or gear drive from a spur gear, friction roller or the like indicated at 95, and shown as fixed on the shaft 96 of the control motor 83. The arm 90, on the other hand, is movable by manual or other suitable means other than said control motor.

Included also in the means for remote control of movement of the load 12, is a relay means here shown as comprising two relay magnets 96 and 97, the armatures 98, 99 of which, respectively pivoted at 100, 101, are biased to the positions shown, that is, to engage a pair of contact points 102 and 103. When the relay 96 or 97 is energized, the armature 98 or 99 is drawn away from contact point 102 or 103, and into engagement with a contact 104 or 105, as the case may be.

When it is desired to move the load 12 in one direction or the other, arm 90 is turned in one direction or the other, to move away from the gap 89. This will energize the control motor 83 for rotation to turn disc 86 in a direction to cause the gap to follow the contactor 91. As soon as the gap reaches any position at which the contactor was halted, in a manner to have the contactor bridge the gap to place both segments 87 and 88 in circuit, both motors are deenergized and stopped. As will be noted, the segment 87 is connected to the relay 96 by a lead 109, and the segment 88 is connected to the relay 97 by a lead 110. These leads 109, 110 have flexible terminal portions 109' and 110' attached to segments 87, 88. Common lead 114' from both relays is connected by leads 111 and 112 to the terminal 6 of the current source 5; while from the terminal 7 of said source leads 115 and 116 go to the contactor 91 through the arm 90.

A switch 112' may be provided, as in the lead 112, to disconnect the circuits for the relays 96, 97, and for the motors 80, 83, when the apparatus is not in use.

Assuming that the relay 97 is energized, by engagement of contactor 91 with segment 88, then the armature 99 will be drawn against contact point 105; the now closed circuit for this relay including lead 115 from terminal 7 of the current source 5, lead 116 to the arm 90, contactor 91, segment 88, lead 110, relay 97, leads 114' and 111, and lead 112 to terminal 6 of the current source.

In such case (energization of the relay 97), the circuit for energizing the load motor 80 and the control motor 83 may be traced as including leads 115, 118, 119 to the winding 81 of the load motor 80; and from the lead 118 a branch lead 119' to the winding 84 of control motor 83. The remainder of the circuit for the winding 81 of the load motor includes leads 120, 123, the armatures 98, 99, the contact 105, and leads 122, 112 to terminal 6 of said source; while the remainder of the circuit for the winding 84 of control motor 83 includes lead 123, armatures 98, 99, contact 105, and leads 122, 112 to the terminal 6.

Assuming, instead, that the relay 96 is energized by engagement of contactor 91 with the segment 87, then the armature 98 will be drawn against contact point 104; the now closed circuit for this relay including terminal 7, leads 115, 116, arm 90, contactor 91, segment 87, lead 109, the relay 96, and leads 114', 111, 112, to terminal 6.

In such case, energizing circuits for the load motor 80 and the control motor 83 may be traced as including leads 115, 118, 119 to the winding 82 of the motor 80, and branch lead 119' to the winding 85 of the control motor. The remainder of the circuit for winding 82 of the load motor includes leads 124, 125, contact 103, armature 99, 98, contact 104, and leads 126, 112 to terminal 6 of the current source; while the remainder of the circuit for the winding 85 of the control motor 83 includes lead 125, contact 103, armatures 99 and 98, contact 104, and leads 126, 112 to terminal 6.

When the gap reaches contactor 91, the gap is bridged and both relays 96, 97 are energized, thereby deenergizing both motors. The circuit for energizing the relays includes leads 115, 116, contact arm 90, contactor 91, segments 87, 88, leads 109, 110, both relay coils, and leads 114, 111, 112. When the relays are thus energized, armatures 98, 99 are drawn against contact points 104, 105. Then the motors are disconnected from the current source, at the contact points 102, 103.

A scale similar to the scale 43 of Fig. 1, and marked 43', is here shown as being circularly complete through 360°. A like fixed scale, marked 43", is arranged around and concentrically with the discs 15 and 26.

The invention also provides a remote control device of the predetermined-position selector type as a feature of the combination herein shown, whereby, for remotely controlled zero-correction purposes, the same procedure as described in connection with Fig. 1 may be employed.

This device includes means for rotating the disc 20 until the pointed end of the lamp A is in line with the "0" calibration of scale 43'; preparatory to closing the switch B so as thereby simultaneously to start the synchronous motors 10 and 11 as above explained—either to start the apparatus, or to restart the same after opening of the switch 9'' as previously explained in order to stop the apparatus for synchronization-correction should there be a departure from synchronism between the motors 10 and 11 for any reason while the apparatus is in use.

The device now being described includes, for effecting zero-correction adjustment of the disc 20, a pair of relatively movable control elements, one of which is a pair of arcuate conducting members separated by a gap and carried by a fixed disc of insulation material, and the other of which is a contact arm revoluble with the disc 20 and carrying a contactor adapted to ride along on either contacting member or to bridge the gap to engage both conducting members, according to the relative position of the pair of control elements. While the segments are separated by two gaps, provision is made, as shown in Fig. 7, and below described, to prevent the contactor from bridging the gap other than the intended one.

This insulation disc, one of the conducting members or segments, the other of said segments, the arm, the gap, and the contactor, are indicated, respectively, at 129, 130, 131, 132, 133 and 134. A motor 135 coacts with these parts for zero-correction purposes. On a shaft 136 in line with the shaft 136' of motor 135 is fixed the contact arm 132. This arm desirably and as here shown is fixed on the shaft 136 in alignment with the lamp A on disc 20. Between shafts 136 and 136' is a normally ineffective clutch 137, and a solenoid 138 is provided for temporarily throwing in the clutch. Between the motor 135 and the clutch there is a speed reducing transmission as indicated at 128. The other parts shown include a dual relay set-up comprising relays 140, 141, their armatures 142, 143, pivoted at 144, 145 respectively, a lead 146 joining the armatures, and reversing windings 147, 148 for the motor 135. From the terminal 6 of the current source is a lead 150 to the arm 132; and extending from the segments 130 and 131 are leads 153, 154, to the relays 140, 141. Between contact points 157, 158, engaged by the arms 142, 143 when both relays are deenergized, are leads 159, 160 going to the reversing windings 147, 148, respectively, of the motor 135. Opposite the contact points 157, 158 are contact points 161, 162, these last joined by leads 163, 164 to a lead 165 connected with the lead 112 joined to the terminal 6 of the current source 5. From a point between the windings 147, 148 extends a lead 167 to the coil of solenoid 138, the other end of the coil being connected to the lead 40 joined to the terminal 7 of the current source 5; while a lead 169 joining the relays 140, 141 is connected through the lead 40, to terminal 7 of the current source.

Thus, when contactor 134 engages one or the other of the segments 130, 131, one or the other of the relays 140, 141 is energized. The energizing circuit for relay 140 includes lead 150, arm 132, contactor 134, segment 130, lead 153, the relay, and leads 169, 40; while the energizing circuit for relay 141 is the same, except that this circuit includes lead 154 between segment 131 and relay 141. When relay 140 is energized, armature 142 is drawn into engagement with contact point 161, and motor 135 is rotated in one direction, through a circuit including lead 40, the solenoid 138, lead 167, winding 148, lead 160, contact 158, armatures 143, 142, contact 161, and leads 163, 165, 112. When relay 141 is energized, armature 143 is drawn into engagement with contact point 162, and the motor is rotated in the opposite direction, through a circuit including lead 40, the solenoid 138, lead 167, winding 147, contact 157, armatures 142, 143, contact 162 and leads 164, 165, 112. When the contactor 134 is at the gap, both relays are energized, through lead 150, arm 132, contactor 134, segments 130, 131, leads 153, 154, the relays, and leads 169, 40. Then the motor 135 is disconnected from the current source, at the contact points 157, 158.

In the lead 40 is a normally open switch 170, which may be of the push-button type; the closing of which switch is for rendering the parts operative as last described.

Operation

Whenever it is desired (as in starting the apparatus) to effect synchronization or (after stopping the apparatus because of the departure from synchronism) to restore phase synchronism, between the discs 15 and 20, the procedure is substantially as described in connection with Fig. 1.

That is, both synchronous motors 10 and 11 are started up, by closing the switches 8 and 9'.

The disc 15 now rotates with the motor 10, and assuming the load is not being moved, and noting that the switch B has not yet been closed, this disc 15 is the only one of the discs 15, 26, 20 which as yet has started rotation.

Assuming that the lamp A is not in registry with the zero-point calibration of scale 43', contact arm 132 will be correspondingly disposed at a point other than at the gap 133. If the arm 132 be now rotated with the shaft 136 to return the contactor 134 to the gap 133, the disc 20 will be rotated with the shaft 136 to restore the lamp A to registry with the zero-point of the scale.

On closing switch 170, one of the relays 140, 141, will be energized and the motor 135 will rotate in the required direction until the contactor 134 reaches and bridges the gap 133, thereby stopping the motor 135 by disconnecting the same from the current source.

To prevent the possibility of the contactor 134 assuming two positions at each of which it bridges one of the two gaps between segments 130, 131, one of these gaps may be arranged as shown in Fig. 7. As here shown the contactor is shaped as a ball 134' and carried by the contact arm 132 so as to engage the flat surfaces of the segments 130 and 131. The segment 130 is shaped so as to provide a ramp 130' at the gap other than the one intended to be bridged; and this ramp will guide the contactor 134' to a point above segment 131, so that when the ball continues its travel it will suddenly drop to engage segment 131, without the possibility of simultaneously engaging both segments at this point. The direction of travel of the contactor 134, when driven from motor 11, is always such, as indicated by the arrow in Fig. 7, as to cause the parts to operate as just described.

Instantaneously incidental to starting of motor 135, the solenoid for throwing in the clutch 137 is energized, for causing the disc 20 to rotate with the motor shaft 136 and with the contact arm 132. Thus, the lamp A is positioned in registry with the zero-calibration of the scale 43 simultaneously with bridging of the gap 133 and stopping of the motor 135 by deenergization of both windings 147 and 148 of the motor. Since the solenoid for throwing in the clutch 137 is in series with these windings, the solenoid is simultaneously deenergized and clutch 137 is thrown out.

Last, the switch B is closed.

Here, too, as in Fig. 1, the apparatus is now set for automatic start of rotation of the disc 20, in such manner as to insure that during subsequent rotation of this disc with disc 15 the contact point 17 on the former and the pointed end of the lamp A on the latter will at any instant be in the same angular position.

Also, as in Fig. 1, start of rotation of the disc 20 occurs at the very next engagement of the contact point 42 on the disc 15 with the fixed contact point 41; as then, switch 9" having been previously closed, the energizing circuit for the solenoid 49, described above in connection with Fig. 1, is closed, and remains closed due to the self-locking shunt circuit including contacts 51 and 52 as in Fig. 1.

Here, again, as in Fig. 1, correction for any departure for synchronism, as between any angular position of the contact 17 and the angular position of the pointed end of the lamp A during use of the apparatus, can be effected as just above described, after momentarily opening the switch 94, to deenergize solenoid 49, and so throw out the clutch 22. The synchronous motor 11 will therefore continue rotation but the disc 20 will stop. Disc 20 being thus disconnected from the synchronous motor 11, the next step is to close switch 170 and hold it closed until the disc 20 is turned by motor 135 sufficiently to effect zero-point correction. The final step is to momentarily close the switch B, for the purpose previously described.

Figure 6:
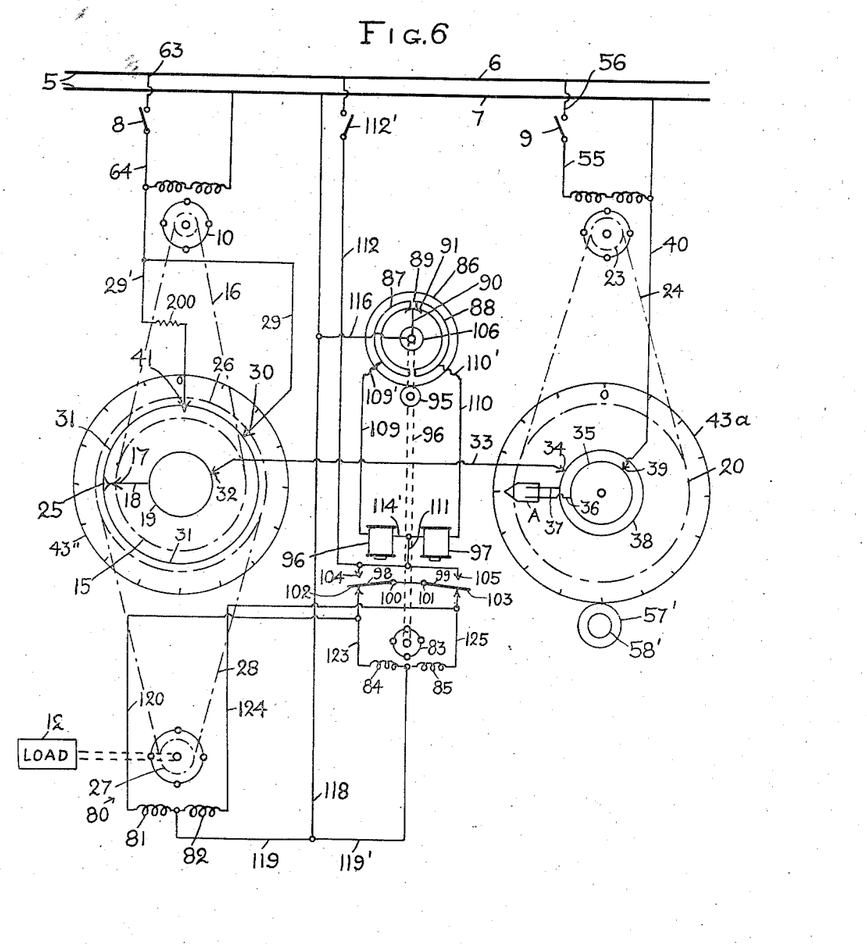
Fig. 6 is a view similar to Fig. 1, showing another modification.

Referring to Fig. 6, the arrangement here shown, while in various respects like that of Fig. 1, is for the purpose of flashing the lamp A not only to indicate the position of the load but also to indicate whether or not zero-point correction is required in regard to the scale subtending the disc 20.

In this arrangement, the parts given the same reference characters as in Fig. 1 correspond to the parts in the latter view. However, while beyond the lead 64 a lead 29' extends to the fixed contact 41, the contact 42 of Fig. 1 is omitted. An impedance means such as a resistor 200 is included in lead 29'. This resistor serves to reduce the intensity of the light flash for the zero point, thereby making it possible to distinguish the zero point flash from the load position indicating flash. An additional advantage of the resistor arrangement resides in that only one wire is required between the indicator and the load location for indicating purposes. While in Fig. 1 the scale 43' is fixed, in Fig. 6 there is substituted a scale on a dial 43a mounted for rotation concentrically with but independent of disc 20.

Fig. 6 also shows a remote control means for positioning the load, similar to that shown in Fig. 5; the corresponding parts of this means being given the same reference characters in Figs. 5 and 6. Operation:

With both synchronous motors 10 and 11 started by closing switches 8 and 9, both discs 15 and 20 will start rotation, and will continue rotating synchronously. According as the load is moved the contact 25 will be correspondingly angularly displaced; thereby to determine the angular position which will be assumed by the disc 15 when contacts 25 and 17 engage. Each engagement of these contacts will flash the lamp A through a circuit including the terminal 6 of the source of current, lead 64, switch 8, lead 29, contact 30, slip-ring 31, contacts 25, 17, lead 18, slip-ring 19, contact 32, lead 33, contact 34, slip-ring 38, lead 37, the lamp A, lead 36, slip-ring 35, contact 39 and lead 40 to terminal 7. This flash of the lamp A will thus indicate the true position of the load, assuming that no zero-point correction is required between discs 15 and 20.

Each engagement of contacts 17 and 41 will also flash the lamp A, at the angular position of the disc 20 which corresponds to the zero position of the scale 43". This last described flashing lamp A is effected by means of a circuit including lead 63 from the terminal 6 of the current source, switch 8, leads 64, 29', resistor 200, contacts 41, 17 and from the latter back to the terminal 7 of the current source by way of circuit connections as just above described in explaining the circuit including contacts 25, 17. Thus, when contact 17 arrives at the zero-point of disc 15 as indicated on scale 43", that is, opposite contact 41, the lamp A will flash with reduced brightness either at the zero-point of the disc 20 or at a location offset therefrom, according to the relative angular positions of contact 17 and lamp A on discs 15 and 20, respectively, during synchronous rotation of both discs.

Should it be seen after starting up the apparatus that the zero-point flash on disc 20 is out of registry with the zero-point calibration of the scale on dial 43a, and even if then the load position is close to the zero-point, the two flashes of the lamp, a brighter one for indicating load position and a dimmer one for indicating zero-point position, will be readily distinguishable one from the other and zero-point correction is readily effected by operating a knob 58' corresponding to the knob 58 of Fig. 1. Here, however, the friction drive wheel 57' turned with the knob is for rotating the dial 43a instead of the disc 20 as in Fig. 1. To this end, the wheel 57' and knob 58' are rotatably mounted so that the wheel is always in engagement with the dial periphery, and with enough frictional grip to allow turning of the knob and wheel to rotate the dial when desired and to prevent casual or accidental rotation of the dial to displace it from any position in which it is set. To effect zero-point correction, the knob is turned until the zero-point on the scale of the dial is in registry with the angular position of the zero-point flash of the lamp. When zero-point correction is thus effected, the knob 58' is released.

It is to be understood that to facilitate the disclosure, the governing and governed elements have both been described as changing position to assume different angular positions; and, indeed, as the invention is now appraised, such terminology is appropriate to what is believed to be the most practicable way to practice the invention. However, it is to be understood that the invention is applicable to other cases than where the load is rotated; for instance, where the load is moved through a non-circular endless path, or back and forth through a straight or otherwise extending path. Also the load can be rotated, and an indicium flashed or otherwise displayed at an appropriate point along a rectilinear or other line, as the result of translational movement of the device for giving the indicium. Again, the load can be translationally moved, and the indicium flashed or otherwise displayed at an appropriate point along a path other than an endless one. All these situations could be met merely by interpolating an appropriately suitable motion transforming means of the various kinds well known in machine design, between a governing element operating with the load to change position proportionately to changes of position of the load, and a governed element changing its position proportionately to changes of position of the governing element.

It will be understood that various features and principles of each of the embodiments of the invention above described or referred to may be utilized or substituted in other embodiments.

While the invention has been described in detail with respect to certain particular preferred examples, it will be understood by those skilled in the art after understanding the invention that various changes and further modifications may be made and parts of the improvements may be used without others, without departing from the spirit and scope of the invention, and therefore it is intended in the appended claims to cover all such changes and modifications.

We claim:

1. Apparatus for indicating the position and movement of a useful load comprising normally ineffective signal means; movable means operable at a point in the path of movement thereof for operating the signal means; a second movable means for displaying a signal from the signal means at a point removed from the load; a third movable means responsive to load movement for changing the location of signal display to indicate the position of the load; means for moving the first and second movable means simultaneously and at predeterminedly related speeds; manually operable means for first starting movement of one of the first two movable means; manually operable means for thereafter starting movement of the other of the first two movable means; and means responsive to operation of the second named manually operable means for causing the movable means started thereby to start moving at an instant to insure that as one of the first two movable means passes a predetermined point in its path of movement, the other of the first two movable means will simultaneously pass a predetermined point in its path of movement.

2. Apparatus for indicating the position of a useful load, comprising a first rotary member; a motor for rotating the member; a second rotary member; signal means at the second member; a second motor for rotating the second member and constructed to rotate synchronously with the first motor; a third rotary member; drive means to move the load and to rotate the third rotary member concentrically to the first rotary member; cooperating contacts on the first and third member arranged to engage each other once during each revolution of the first rotary member; circuit means including the cooperating contacts and the signal means for momentarily energizing the signal means when said contacts engage each other; a supplementary contact at the first rotary member; a stationary contact cooperating with the supplementary contact; and circuit means including the stationary contact and the supplementary contact for causing rotation of the second member when the supplementary contact engages the stationary contact, thereby coordinating the relative position of the signal means and of the cooperating contact at the first member during rotation of the first and the second members.

3. Apparatus for indicating the position of a useful load, comprising a first rotary member; a motor for rotating the first member; a second rotary member; a signal lamp at the second member; a second motor constructed to rotate synchronously with the first motor; clutch means for coupling the second motor and the second rotary member; a third rotary member; drive means to move the load and to rotate the third rotary member concentrically to the first rotary member; cooperating contacts on the first and third member arranged to engage each other once during each revolution of the first rotary member; circuit means including the cooperating contacts and the lamp for momentarily energizing the lamp when said contacts engage each other; electro-magnetic means for actuating the clutch means; a supplementary contact at the first rotary member; a stationary contact cooperating with the supplementary contact; and a circuit means including the electro-magnetic means, the stationary contact and the supplementary contact for energizing the electro-magnetic means when the supplementary contact engages the stationary contact, thereby starting rotation of the second rotary member when the lamp at the second member is in a predetermined position relative to the cooperating contact at the first member.

4. Apparatus for indicating the position of a useful load, comprising a first rotary member; a motor for rotating the first member; a second rotary member; a signal lamp at the second member; a second motor constructed to rotate synchronously with the first motor; clutch means for coupling the second motor and the second rotary member; a third rotary member; drive means to move the load and to rotate the third rotary member concentrically to the first rotary member; cooperating contacts on the first and third member arranged to engage each other once during each revolution of the first rotary member; a circuit including the cooperating contacts and the lamp for momentarily energizing the lamp when said contacts engage each other; electro-magnetic means for actuating the clutch means; a supplementary contact at the first rotary member; a stationary contact cooperating with the supplementary contact; manual means to rotate the second rotary member for placing the signal lamp in a zero position, the cooperating contact at the first rotary member being constructed to occupy a position corresponding to the zero position of the signal lamp when the supplementary contact engages the stationary contact; and circuit means including the electro-magnetic means, the stationary contact and the supplementary contact for energizing the electro-magnetic means when the supplementary contact engages the stationary contact, thereby starting rotation of the second rotary member when the lamp at the second member is in a predetermined position relative to the cooperating contact at the first member.

MICHEL N. YARDENY.
ROBERT BERNAS.